United States Patent [19]

Webber

[11] Patent Number: 4,630,447
[45] Date of Patent: Dec. 23, 1986

[54] REGENERATED INTERNAL COMBUSTION ENGINE

[76] Inventor: William T. Webber, 30704 Davey Jones Dr., Agoura, Calif. 91301

[21] Appl. No.: 813,595

[22] Filed: Dec. 26, 1985

[51] Int. Cl.⁴ .............................................. F02G 1/02
[52] U.S. Cl. ......................................... 60/712; 60/516
[58] Field of Search ......................... 60/517, 516, 712

[56] References Cited

U.S. PATENT DOCUMENTS

| 155,087 | 9/1874 | Hirsch | 60/712 X |
| 4,004,421 | 1/1977 | Cowans | 60/516 |
| 4,074,533 | 2/1978 | Stockton | 60/712 X |
| 4,364,233 | 12/1982 | Stang | 60/712 X |

Primary Examiner—Allen M. Ostrager
Attorney, Agent, or Firm—Harry B. Field

[57] ABSTRACT

A thermally regenerated four-stroke cycle internal combustion engine, comprises a cold side cylinder having intake and exhaust valves independently located through cold side cylinder wall, and a cold side piston connected through a connecting rod to a crankshaft; a hot side cylinder having fuel injector and ignitor and hot side piston connected to said cold side piston through the crankshaft; and a regenerator duct for housing a regenerator and for connecting cold and hot side cylinders.

6 Claims, 11 Drawing Figures

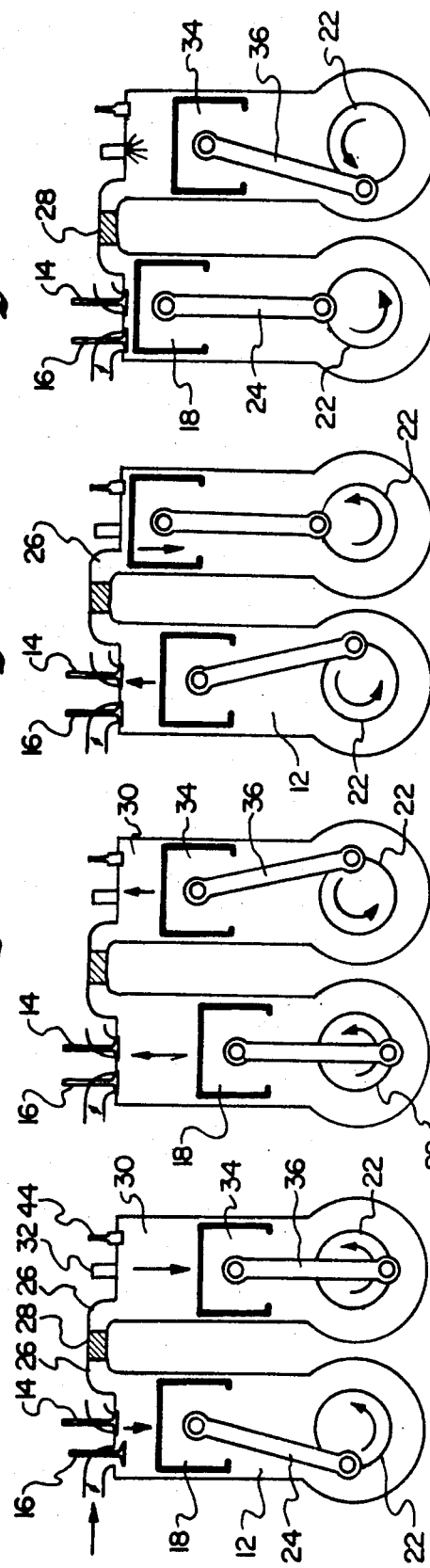
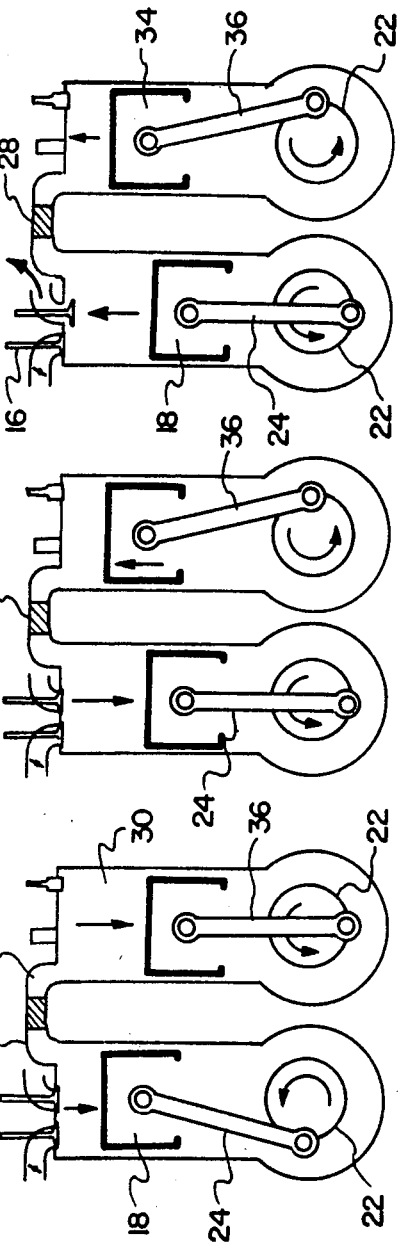

REGENERATED INTERNAL COMBUSTION ENGINE

BACKGROUND OF THE INVENTION

1. Field of the Invention

This invention relates to internal combustion and Stirling engines and more specifically to regenerated internal combustion engines.

2. Description of the Prior Art

The engine of the present invention has roots in two directions. First as an internal combustion engine, it is closely related to Otto and Diesel engines. Secondly, since it has a regenerator it is also closely related to the Stirling engine: combining features from these engine types gives an engine which has the high efficiency of the Stirling engine and the simplicity of construction of the internal combustion engine. This kind of engine was basically conceived by Joseph Hirsch and patented in U.S. Pat. No. 155,087, issued in 1874.

The Stirling engine, which is the precursor of all subsequent regenerated heat engines, was invented and patented in 1816 in the United Kingdom by Rev. Robert Stirling. The Stirling engine originally consisted of a working piston and cylinder, and a displacer piston, with suitable means to drive them in phased reciprocating motion, hot and cold side heat exchangers and a regenerator. Other arrangements of the working parts were later devised, such as the engine patented in 1876 by Alexander Rider, which used a second working piston to replace the dispenser piston of the original Stirling engine. During the latter portion of the nineteenth century the Stirling engine was a practical alternative to the steam engine for low power applications where safety and simplicity of operation were important. The Stirling engines of this era tended to be relatively bulky and heavy relative to their power output, but this was due principally to the primitive state of the heat transfer technology which was used in the heat exchangers. When Joseph Hirsch invented a modified Stirling engine in which internal combustion replaced the hot side heat exchanger he eliminated these limiting features of the engine. Unfortunately, at essentially the same time Nicolaus Otto invented the four stroke cycle internal combustion engine. Since Otto was employed by a firm whose business was the manufacture of gas engines, his new design was quickly put into production, and because of its simplicity, high power and low cost it has dominated the transportation industry for the past three-quarters of a century.

When the Otto engine and the Hirsch engine are compared using modern thermodynamic analysis, it can be shown that the Hirsch engine is theoretically capable of giving over twice the thermal efficiency which is possible using the Otto cylce; however, by the time that thermodynamic theory had advanced to the point where it was possible to make this comparison, the Hirsch engine had fallen into obscurity, and apparently there has never been a published description of its thermodynamic cycle.

The Hirsch engine has been intermittently rediscovered and improved over the past half century, as evidenced by the patents of Kenneth Cowans (U.S. Pats. Nos. 4,004,421 and 3,379,026), Konstantin Pattas (U.S. Pat. No. 3,777,718) and Thomas Stockton (U.S. Pat. No. 4,074,533), and by the published research studies of E. G. Hurley, "Tests on a Twin Piston Stirling Cycle Engine, Using Internal Combustion", Report K. 121, Shell Thornton Research Center, Chester, U.K. (1954) and E. H. Otten, "Tests on a Displacer-type Stirling Engine, Using Internal Combustion", Report K. 140, Shell Thornton Research Center, Chester U.K. (1956). Apparently none of these improvements and disclosures has been sufficient to threaten the entrenched position of the Otto engine.

The starting point for all of these engines is the classic Stirling cycle which is completed in one revolution of the crankshaft. The ninety degree phase difference between the pistons (in a Rider configuration 2-piston engine) means that in one rotation of the crankshaft the pistons move in the same direction for two quarter revolutions, and move in opposite directions for two quarter revolutions. Each of these quarter revolutions of the crankshaft is used for a different thermodynamic event. In the first quarter revolution the pistons both move upward, compressing the working fluid. In the next quarter revolution, in the classic external combustion Stirling engine, the compressed working fluid is moved through the cold side heat exchanger which removes the low-temperature waste heat generated by compression, through the regenerator, which returns high-temperature heat stored from the previous cycle, and through the hot side heat exchanger which adds high-temperature heat to bring the working fluid to its peak cycle temperature. In the expansion quarter revolution, the pistons both move downward, extracting work from the high-temperature, high pressure gas. In the next quarter revolution the working fluid is again moved through the hot side heat exchanger, which replaces heat lost in the power stroke, through the regenerator, which stores the high-temperature heat, and through the cold side heat exchanger which brings the gas back to the minimum cycle temperature prior to the next compression.

In all the prior art internal combustion Stirling engines the hot side heat exchanger is eliminated, and its function is replaced by injecting and burning fuel in the hot cylinder volume. However, in order to replace the oxygen consumed by the combustion process, all of the prior art engines have required an auxilliary air compressor, supercharger or blower to introduce fresh air into the working fluid. The present invention shows that by changing from a two-stroke cycle to a four-stroke cycle the compressor or blower is not required; instead, every alternate revolution of the engine is used to intake fresh air and to exhaust spent combustion products.

In the prior art internal combustion Stirling engines different methods have been taught to dispose of waste heat. The second law of thermodynamics states that waste heat must be discharged from every engine which converts high temperature heat into work. This law of nature is sufficiently basic that machines which purport to do otherwise are sometimes called "perpetual motion machines of the second kind".

The Cowans engine and the experimental engine described by Hurley both include coolant passages or a conventional water-cooled heat exchanger for removing the waste heat. Thus these engines follow classic external combustion Stirling engine technology for waste heat removal, and suffer from the expense and complication of providing heat exchangers to transfer waste heat from the working fluid to the coolant, and radiators to reject the heat from the coolant.

The Hirsch engine discharges its waste heat without the use of either a heat exchanger or a radiator. It does this by injecting a spray of cooling water directly into the cold cylinder working volume. The water is vaporized by the heat of compression, and the water vapor, bearing the cycle waste heat is then exhausted with the spent combustion products.

While the Hirsch engine eliminates the requirement for cold side heat transfer equipment, it introduces the new requirement for large quantities of relatively pure cooling water, which would be an undesirable feature in an automotive power plant. The Pattas engine has no cold side heat exchanger, and does not inject cooling water, hence the waste heat rejection in the Pattas engine must be accomplished by heat transfer through the piston head and cylinder walls of the cold gas section, and/or by convecting heat out with the partial exchange of the working medium each revolution. Pattas teaches that only a partial exchange of the working medium is required each revolution, and the only reason stated for the exchange is the replenishment of oxygen required for combustion. When an engine is run according to this teaching, the heat rejection from the cold gas section is inadequate, causing the temperature to rise with a resulting reduction of power output and thermal efficiency. Thermodynamic calculations show that if an engine of this sort, with adiabatic walls, is run injecting only the minimum amount of air required for combustion, the cold space temperature will increase without bound, eventually reducing the power output and efficiency to zero. The present invention shows that in order to obtain high power output and efficiency without the requirement for cold space heat exchangers or water injection it is necessary to pass the maximum possible mass of air through the engine, so as to carry away the waste heat in the exhaust stream and thus maintain the cold cylinder working fluid at a low temperature level. This requirement is well met by the use of the four stroke cycle, in which each alternate revolution of the engine is devoted to exhausting one displacement volume of spent, warm working fluid, and intaking one displacement volume of cold fresh air.

A problem which must be addressed with any heat engine is control of the output torque or power. This is especially important in an automotive power plant, where the engine operates most of the time at a small fraction of full power, but must still maintain a high thermal efficiency. Rapidity of control is also very important. The Hirsch engine is equipped with a throttle valve in the regenerator duct, which would give a very rapid control, at the expense of efficiency, and also incorporates an air compressor and governor-regulated back-pressure valve, which control torque by varying the mean pressure level of the working fluid. The Cowans engine throttles the intake to the air compressor to produce the desired variation in the mean pressure of the working fluid. This decreases efficiency at part throttle because of the "pumping loss", which is the net compression work which must be done to raise the low pressure air behind the throttle valve to the atmospheric pressure at which it is eventually exhausted from the engines. A more loss-free method of controlling power in an open cycle Stirling engine is to vary the volume ratio (compression ratio) by varying the clearance volume. One way of doing this is by providing a series of appropriately sized volumes which can be connected to or isolated from the working volume by opening or closing valves. This method of power control has been used on closed cycle Stirling engines, and is particularly well suited to an open cycle Stirling engine. Another method of varying the compression ratio for power control is to locate a movable plunger or piston and cylinder so as to communicate with the working volume of the engine. Retracting the piston into its cylinder will increase the clearance volume of the engine, reduce the compression ratio, and reduce power. This method is especially appropriate to an engine which is at atmospheric pressure during a portion of each cycle, because relatively small forces are required to move such a control piston during this portion of the cycle. Since there are high pressure forces on the control piston during other portions of the cycle, it is desirable to position the control piston by machine elements which will not convey the periodic high forces back to the control mechanism. Such machine elements are well-known, and include screws or wormgears, wedges or cams with shallow angles and hydraulic cylinders with check valves. Control of power by variation of the compression ratio is limited because of the large volumes required for very large power variations; for this reason the technique is well suited for controlling cruising power, but it is not well suited for reducing power to idling levels. For this reason, an automotive powerplant should be equipped with the compression ratio control for efficient cruising power control, and with an intake or regenerator duct throttle valve to reduce power to idling values.

A regenerated internal combustion engine differs from a non-regenerated engine by its capability to extract unused high temperature heat from the spent working fluid and re-introduce it into the working fluid compressed for the succeeding cycle. Although this is a benefit in many ways, it also presents a problem of temperature control which is not found in non-regenerated engines. A conventional Otto engine starts anew each cycle by drawing in a charge of cold fresh air mixed with fuel vapor. This charge is compressed and burned, and attains a final burned temperature which depends upon the heating value of the fuel, the fuel/air ratio and the compression ratio. The final temperature attained during each particular cycle of operation depends only upon the values for these variables which were in effect during that particular cycle. Hence an Otto engine can never attain a working fluid temperature higher than the maximum which occurs at approximately the stoichiometric fuel/air ratio. If the engine hardware is built to withstand this gas temperature it should also be capable of withstanding the temperature at any other operating point. What is true for an Otto engine is also true for a Diesel engine, i.e. the peak gas temperature attained during each cycle depends upon the compression ratio, and fuel/air ratio, used for that particular cycle of operation, but does not depend upon what has taken place during previous cycles. The situation in a regenerated internal combustion engine is completely different. When the compressed air is passed through the regenerator, it is heated to the temperature which was reached by the previous charge of working fluid at the end of its expansion stroke. Fuel is then injected and burned to attain the peak cycle temperature, and the fluid is then expanded, which removes work and lowers its temperature. If the temperature increment due to the combustion of fuel is greater than the temperature decrement from the expansion, the final gas temperature which is stored in the regenerator will be higher than the temperature taken from the regenerator earlier in the cycle. If this imbalance of heat addition and work extraction persists for a considerable number of cycles the regenerator hot-end temperature can rise (or fall) without bound. Rising too far can cause the production of nitrogen oxides and can damage the regenerator. Falling too far can cause lowered efficiency, and impaired ignition of the fuel. Since the torque of the engine is controlled by compression ratio variation and by throttling, it is not obvious from the response of the engine when the temperature is rising or falling out of the desired range. In order to control the regenerator hot-end temperature a feedback controller must be employed, which senses the regenerator hot end temperature and increases or decreases the amount of injected fuel accordingly, so as to hold the temperature in the desired range. The temperature sensing method can be by high temperature thermocouple or by sensing the ratio of pressures before and after the regenerative heating event in the cycle. The sensing of the pressure ratio requires the use of complex electronics such as a microcomputer, but gives the fastest possible response to unwanted variations in temperature.

SUMMARY OF THE INVENTION

Accordingly, there is provided by the present invention a thermally regenerated four-stroke cycle internal combustion engine. The subject engine comprises at least one pair of cylinders. The cold side cylinder comprises an intake valve located through the cold side cylinder wall for drawing air into its cold side cylinder, an exhaust valve independently located through the cold side cylinder wall for emitting exhaust gases; and a cold side piston connected to a crank shaft through a connecting rod. A hot side cylinder, having a fuel injector and an igniter located through the hot side cylinder wall and a hot side piston connected to a crank shaft through a connecting rod. A regenerator duct for connecting the cold side and hot side cylinders and for housing a regenerator. Valve operating mechanism which opens the intake and exhaust valves each for one quarter of each 4 stroke cycle. Power control mechanism consisting of movable pistons or valved auxiliary volumes for cruise control and an intake throttle for idle power control. Temperature or pressure ratio sensors controlling the amount of fuel injected each cycle so as to maintain the regenerator hot end temperature in the desired operating range.

OBJECTS OF THE PRESENT INVENTION

Therefore, an object of the present invention is to provide an internal combustion engine which obtains greatly improved thermal efficiency and fuel economy by storing the unused high temperature heat from the expanded working fluid in a regenerator and subsequently re-introducing it into the compressed working fluid in the succeeding cycle.

Another object of the present invention is to provide an internal combustion engine which can effectively burn low quality alternative fuels, in particular fuels having low cetane number, low octane number, extended boiling range, high aromaticity, low specific heat content or low flammability.

Still another object of the present invention is to provide an internal combustion engine which burns its fuel so completely that the exhaust gases contain essentially no unburned hydrocarbons, no carbon monoxide, no soot particulates and no malodorous organic aldehydes, esters, phenols, alcohols or acids.

Yet another object of the present invention is to provide a heat engine having the high thermal efficiency of a Stirling engine, but without a requirement for either a hot-space or a cold-space heat exchanger or a radiator to dissipate the heat taken from the cold-space heat exchanger.

Still a further object of the present invention is to provide an internal combustion Stirling engine which does not require a separate air compressor or scavenging blower to introduce fresh air for combustion or cooling.

A further object of the present invention is to provide an internal combustion Stirling engine which does not require a separate expander to extract residual work from its exhaust gases.

Another object of the present invention is to provide an internal combustion Stirling engine which does not require a compressor and dump valves for the control of output torque.

Another object of the present invention is to provide temperature sensing means to control the amount of fuel injected so as to maintain the hot cylinder temperature in a desirable temperature range, which is high enough to provide complete combustion and efficient operation, but not so high as to cause engine damage or excessive nitrogen oxide formation.

A further object of the present invention is to provide an internal combustion Stirling engine which can be constructed from existing gasoline engine hardware by retrofitting new cylinder heads fitted with regenerators, fuel injectors, ignitors, intake and exhaust valves and control mechanisms.

It is another object of the present invention to create a four-stroke cycle internal combustion engine having extremely high thermal efficiency.

Other objects, advantages and novel features of the present invention will become apparent from the following detailed description of the present invention when considered in conjunction with the figures.

BRIEF DESCRIPTION OF THE DRAWINGS

FIG. 1a–1g is a schematic representation of the operational sequence of the thermally regenerated four-stroke internal combustion engine.

The same elements or parts throughout the figures of the drawing are designated by the same reference characters, while equivalent elements bear a prime designation.

DESCRIPTION OF THE INVENTION

Figure 2:
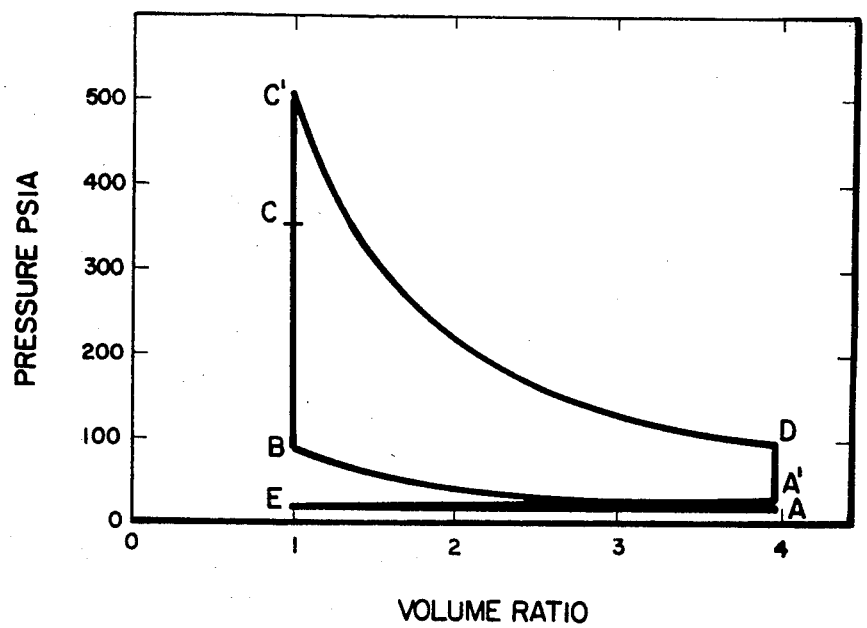
FIG. 2 is a graphical representation of an idealized pressure-volume diagram for the thermally regenerated four-stroke internal combustion engine.
Figure 3:
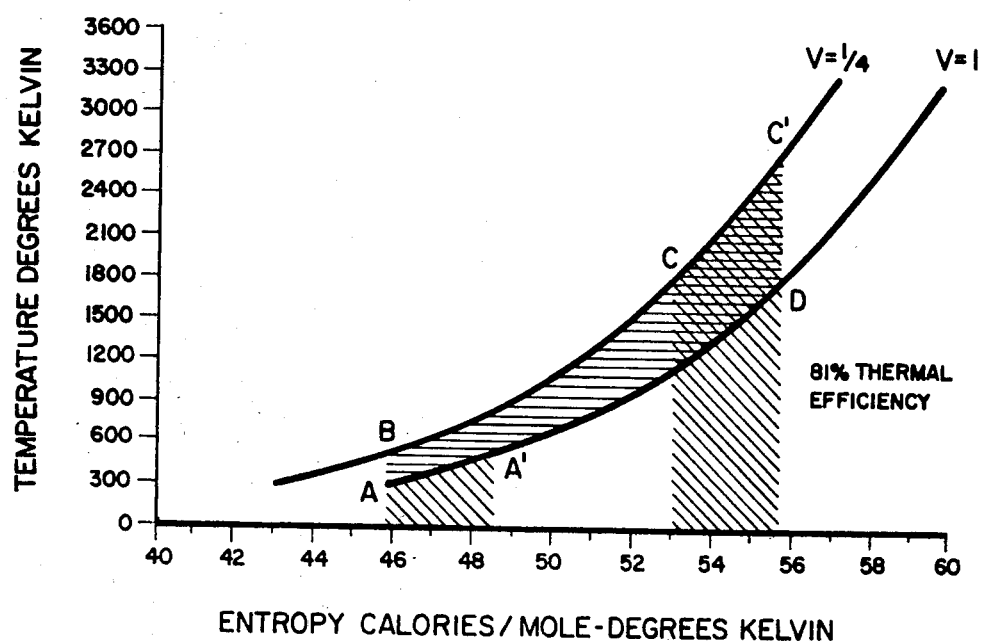
FIG. 3 is a graphical representation of an idealized temperature-entropy diagram for the thermally regenerated four-stroke internal combustion engine.

FIGS. 1a through 1g schematically illustrate the seven sequential events making up the thermally regenerated four-stroke internal combustion cycle. The working fluid can pass through the regenerator 28 with very little pressure drop, and consequently, the system fluid volume which will be used for the pressure vs. volume diagram, FIG. 2, consists of the sum of the two volumes above the pistons plus the volume of the regenerator duct. The two pistons 18 and 34 are shown attached to crank throws 22 which are 90° out of phase (the hot side piston 34 is 90° ahead of the cold side piston 18) and the minimum system fluid volume can be shown to be attained when the cold side piston 18 is 45° before top dead center (TDC) and when the hot side piston 34 is 45° after top dead center. If there were no clearance volumes above the pistons at their respective top dead center positions, and if the regenerator duct had zero volume, this out-of-phase situation of the pistons would restrict the system volume ratio (compression ratio) to approximately 6 to 1. If reasonable values are assumed for clearance and regenerator duct volumes, the maximum volume ratio will probably be restricted to about 4 to 1 in practical hardware. Fortunately, the thermal efficiency gained from the use of the regenerator is very appreciable, and the use of a limited compression ratio in the regenerated engine does not reduce its thermal efficiency. The total system volume displays the same approximately sinusoidal variation with crank angle as in a single piston-cylinder arrangement, so the pressure-time relationships of this engine do not differ appreciable from those of familiar reciprocating piston hardware. The cycle description starts with the intake stroke, FIG. 1a. The cold side piston 18 is initially TDC while the hot side piston 34 is initially 90° past TDC. With the intake valve 16 open and the exhaust valve 14 closed, the cold side piston 18 moves to bottom dead center (BDC) while the hot side piston 34 moves to 90° past BDC. During this stroke, the volume of the working space increases, and cold atmospheric air flows in to fill the increased volume. At the end of the stroke the intake valve 16 is closed. The next event, FIG. 1b, is the compression half-stroke. The cold piston 18 and the hot side piston 34 both move upward, with the cold piston moving from BDC to 90° above BDC while the hot piston moves to TDC. At this time all of the working fluid has been expelled from the hot side cylinder 30 and is compressed to something over a quarter of the total system volume in the cold side cylinder 12 and in the clearance volumes and regenerator duct 26. In terms of the pressure-volume diagram, FIG. 2, the fluid was initially ambient temperature air, and the compression can be approximated by the adiabatic compression AB on the pressure volume diagram of FIG. 2, or the isentrope AB on the T-S diagram, FIG. 3. The next half-stroke, FIG. 1c, of the cycle moves the cold side piston 18 to TDC while simultaneously moving the hot side piston 34 to 90° past TDC. There is no net change in volume between the beginning and ending of this half-stroke, and the most important occurrence is that the working fluid has been forced through the regenerator 28. It enters the cold side 40 of the regenerator at a temperature corresponding to the adiabatic compression which it has undergone, i.e. about 550° K. (530° F.), but it emerges from the hot end 42 of the regenerator 28 at a temperature of approximately 1800° K. (2780° F.), which is the temperature of the gas exhausted from the previous expansion stroke. Because of the high temperature and oxidizing atmosphere, the regenerator must be constructed of a high temperature oxidation resistant material. Alumina, Zirconia and Ceria are representative of the high-temperature ceramics which appear to be well suited for use in the regenerator matrix, and which are available commercially in the required fibrous, woven, felted or perforated monolithic forms. The fluid, heated by passage through the regenerator 28, increases in pressure as illustrated by segment BC on the P-V and T-S diagrams, FIGS. 2, 3. It is important to note that the heat supplied to the gas by the regenerator 28 is a direct substitute for heat which is provided by the burning of fuel in a non-regenerated engine. The next cycle step FIG. 1d is to inject fuel and burn it to attain the maximum cycle temperature. The amount which is burned is much less than the stoichiometric amount, and should only be enough to provide a temperature rise equal to the temperature drop which will occur in the ensuing expansion of the working fluid on the power stroke. For a regenerator hot end 42 temperature of 1800° K. (2780° F.) and an expansion volume ratio of 4 to 1, the maximum cycle temperature should be approximately 2700° K. (4400° F.). This combustion step is illustrated as segments CC' on both the P-V and T-S diagrams, FIGS. 2, 3. The air, preheated by the regenerator 28 attains approximately twice the absolute temperature reached by the compression stroke of a Diesel engine before the injection of fuel, hence ignition is expected to be rapid and spontaneous, even with fuels of very low cetane number. Since the combustion should begin immediately after injection, there should never be any appreciable accumulation of unburned detonable material, and hence there is no apparent requirement for a high octane number fuel. With large amounts of excess high-temperature air available, carbon monoxide and unburned hydrocarbons should be reduced to very low levels. It is likely that any soot particulates which form will be filtered out in the hot end of the regenerator 42 and burned. The formation of nitrogen oxide must be limited by limiting the temperature in the combustion chamber, and this is probably the most important factor limiting the peak cycle temperature. Fortunately, high thermal efficiency can be obtained in the regenerated engine at values for peak temperature much lower than are used in current Otto engines. The next cycle step, FIG. 1e, is the expansion of power half-stroke. The hot side piston 34 moves to BDC while the cold side piston 18 moves from TDC to 90° after TDC. This stroke is illustrated as line segments C'D on both the P-V and T-S diagrams, FIGS. 2, 3. The next cycle half-stroke, FIG. 1f produces no net change in system volume, but moves fluid from the hot side cylinder volume to the cold side cylinder volume by forcing it through the regenerator 28. The air and combustion products which have been cooled to approximately 1800° K. (2780° F.) by expansion give up heat to the regenerator matrix and emerge in the cold side cylinder 12 at approximately the temperature at which they left it, i.e. at the temperature of 550° K.(530° F.) corresponding to their earlier adiabatic compression. This is illustrated by segments DA' in the P-V and T-S diagrams, FIGS. 2, 3. The remaining cycle event, FIG. 1g is to open the exhaust valve 14 and move the left piston to TDC, which reduces the volume of the working space and discharges most of the warm exhaust products to the atmosphere. At the end of this stroke, the exhaust valve 14 closes, the intake valve 16 opens, and the next cycle is ready to commence.

The amounts of heat added and heat rejected from this regenerated cycle engine are very different from a non-regenerated engine. In an Otto or Diesel engine most of the heat discarded is a result of the inability of the expansion stroke to convert heat energy to work with the limited expansion ratio and gamma which are available. In the ideal regenerated engine, the only discarded heat is that associated with the compression of the working fluid. This is close to the thermodynamic minimum of heat rejection. (The theoretical minimum of heat rejection would be that corresponding to an isothermal compression of the ambient temperature working fluid. This is about 25 percent less than for adiabatic compression, but would require impractical modifications to the engine.) The heat added by combustion is ideally exactly equal to the work produced during the power stroke in the regenerated engine, while the net work produced during the cycle is less by the work done on the gas during the compression stroke (and eventually rejected as waste heat during the exhaust stroke). The energy balance is illustrated on the T-S diagram, FIG. 3, where the heat added by burning fuel is the slanted hatched area under segment CC'. The heat rejected is the slanted hatched area under segment A'A and the work done is the area enclosed by the cycle diagram ABCC'DA'A. The thermal efficiency for this idealized cycle using nitrogen as the working fluid, a compression ratio of 4, a maximum gas temperature of 2700° K.(4400° F.) and a minimum temperature of 300° K. (80° F.) is 81 percent. Thus the idealized regenerated internal combustion cycle has a thermal efficiency approximately twice that of a non-regenerated internal combustion cycle. It should be pointed out that the idealized thermodynamic cycle illustrated in FIGS. 2 and 3 does not correspond exactly with the piston motions illustrated in FIGS. 1a through 1g. For the sake of a simple thermodynamic description, the cycle is described in FIGS. 2 and 3 as an adiabatic, isentropic compression and expansion together with thermal regeneration, heat addition and heat rejection, all done at constant volume. Examination of FIG. 1 shows that the regeneration steps in the actual engine do involve small volume changes, and that the compression and expansion steps are more complex than isentropes because of inevitable interactions with the regenerator. The idealized cycle of FIGS. 2 and 3 bears approximately the same relationship to a real regenerated internal combustion engine as the conventional insentrope and isochore representation of an Otto engine bears to a real Otto engine, and serves the same purpose, i.e. it illustrates in a simple way the effects of the pertinent thermodynamic variables upon efficiency, power output, etc.

Figure 4:
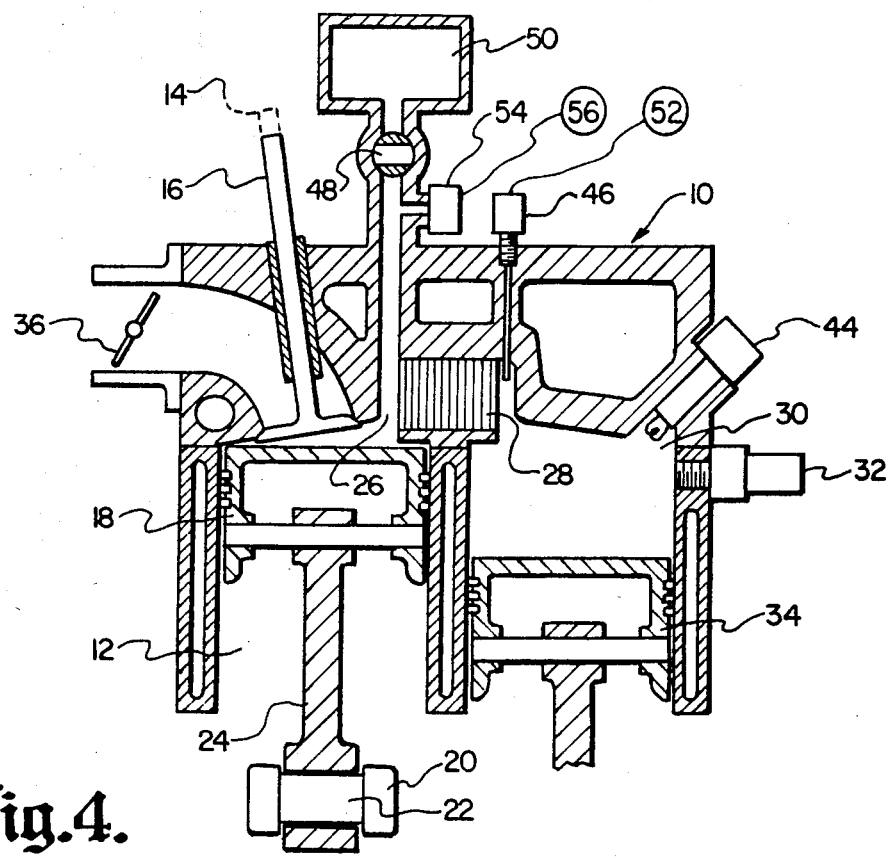
FIG. 4 is a schematic representation of one embodiment of the present thermally regenerated four-stroke internal combustion engine.

Referring now to FIG. 4, there is shown a schematic cross-sectional view of a thermally regenerated four-stroke cycle internal combustion engine generally designated 10 comprising a cold side cylinder 12, the intake valve 16, exhaust valve 14, which is hidden behind the intake valve, and cold side piston 18 connected to a crankshaft 20 having throw 22 through connecting rod 24. Cold side cylinder 12 is connected through regenerator duct 26 and regenerator 28 to hot side cylinder 30. Hot side cylinder 30 further comprises fuel injector 32, spark plug or glow plug igniter 44, hot side piston 34 connected to a crankshaft 20 having throw 22 through connecting rod 36.

The above described engine 10 can be further enhanced by providing means for controlling the hot space temperature and the torque produced. In the present invention, the hot space temperature must be maintained at a relatively constant level, thus the power control means must be distinct from the conventional fuel supply control used in Diesel engines. The regenerator hot end temperature may be sensed by thermocouple 46, whose signal is sent to controller 52 to regulate the amount of fuel injected each stroke so as to maintain the hot space temperature within the desired range. Alternatively pressure transducer 54 may be used to sense the pressure at times corresponding to the beginning and end of the regenerative heating event, with the pressure ratio being used to measure the temperature and control the amount of injected fuel. In this case the controller 56 must be more elaborate, possibly containing a microcomputer, in order to translate from a ratio measurement to a fuel control signal.

In FIG. 4, throttling is accomplished with the clearance volume 50 and with the valve 48 and with butterfly valve throttling means 36. Opening the valve 48 lowers the compression ratio and hence the engine torque. Closing the butterfly valve 36 lowers the cycle pressure and torque, but with an undesirable decrease in the cycle efficiency due to pumping losses.

Figure 5:
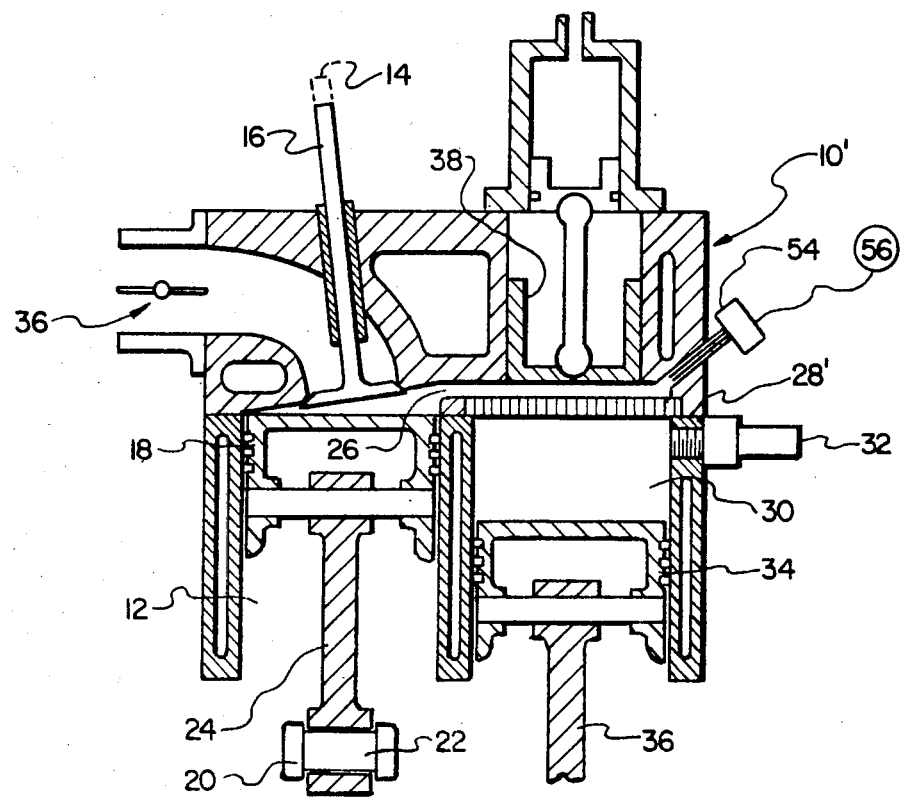
FIG. 5 is a schematic representation of a second embodiment of the present thermally regenerated four-stroke internal combustion engine.

Turning now to FIG. 5, there is shown a second version of the thermally regenerated four-stroke cycle internal combustion engine generally designated 10'. Four-stroke cycle internal combustion engine 10' comprises the same basic components as engine 10, FIG. 4; however, in addition to a butterfly throttling means 36, power control is accomplished by providing the engine with a continuously variable clearance volume capability. By way of example, and not limitation, the varying clearance volume means can be a moveable piston 38. Clearance volume piston 38 can be moved by means of hydraulic or other actuators controlled by an accelerator type pedal which when depressed causes the clearance volume to decrease, and when released causes the clearance volume to increase.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A thermally regenerated four-stroke cycle internal combustion engine, comprising:
   a cold side cylinder, having:
      an intake valve located through cold side cylinder wall for drawing air into said cold side cylinder;
      an exhaust valve independently located through said cold side cylinder wall for emitting exhaust gases; and
      a cold side piston connected to a crank shaft through a connecting rod;
   a hot side cylinder having:
      a fuel injector and igniter located through hot side cylinder wall; and
      a hot side piston connected to a crank shaft through a connecting rod;
   a regenerator duct, for connecting said cold side and said hot side cylinders and for housing a regenerator oriented so as to have its cold end adjacent to said cold side cylinder and the hot end adjacent to said hot side cylinder;
   means for opening and closing the intake and exhaust valves once each two crankshaft revolutions; and
   means for injecting fuel into said hot cylinder once each two crankshaft revolutions.

2. The four-stroke cycle internal combustion engine of claim 1 further comprising a valve-controlled clearance volume for the control of power.

3. The four-stroke cycle internal combustion engine of claim 2 wherein said clearance volume variation is accomplished through a piston moveable so as to increase or decrease the clearance volume in accordance with demand.

4. The four-stroke cycle internal combustion engine of claim 1 further comprising a temperature-sensing device located in the combustion gases adjacent said hot end of said regenerator, and a regulator controlled by said sensing device for regulating the amount of fuel injected into said hot side cylinder, thereby maintaining the engine hot side temperature in the desired operating range.

5. The four-stroke cycle internal combustion engine of claim 1 further comprising a fast response pressure transducer located within the cold cylinder for measuring the system pressure before and after regenerative heating of the air and a regulator controlled by the ratio of said measured pressures for regulating the amount of fuel injected into said hot side cylinder, thereby maintaining the engine hot side temperature in the desired operating range.

6. A process for operating a thermally regenerated four-stroke cycle internal combustion engine, which comprises a cold side cylinder, having an intake valve located through cold side cylinder wall for drawing air into said cold side cylinder, an exhaust valve independently located through said cold side cylinder wall for emitting exhaust gases, and a cold side piston connected to a crankshaft through a connecting rod, a hot side cylinder having a fuel injector and igniter located through hot side cylinder wall and a hot side piston connected to a crankshaft through a connecting rod; a regenerator duct for connecting said cold side and said hot side cylinders and for housing a regenerator oriented so as to have its cold end adjacent to said cold side cylinder and the hot end adjacent to said hot side cylinder; means for opening and closing the intake and exhaust valves once each two crankshaft revolutions; and means for injecting fuel into said hot cylinder once each two crankshaft revolutions, comprises the steps of:

intaking air through said intake valve by moving said cold side piston to bottom dead center while moving said hot side piston to 90° past bottom dead center, closing said intake valve;

compressing said air by moving said cold side piston to 90° past bottom dead center while said hot side piston moves to top dead center;

transferring said air from said cold side cylinder through said regenerator to said hot side cylinder by moving said cold side piston to top dead center while moving said hot side piston to 90° past top dead center, storing waste heat of compression in cold end of said regenerator while concurrently transferring stored high temperature heat from hot end of said regenerator into said air;

injecting fuel into said hot side cylinder to form a fuel-air mixture;

combusting said fuel in mixture to attain combustion products and the maximum cycle temperature;

expanding the mixture of air and combustion products by moving said hot side piston to bottom dead center while moving said cold side piston to 90° past top dead center;

transferring said combusted products from said hot side cylinder to said cold side cylinder by forcing said combusted products through said regenerator by moving said hot side piston to 90° past bottom dead center, while moving said cold side piston to bottom dead center;

transferring heat from combustion products into the hot end of said regenerator while concurrently transferring waste heat from the cold side of said regenerator into said combustion products;

opening said exhaust valve;

moving said cold side piston to top dead center while moving said hot side piston to 90° past top dead center so as to remove the chemically vitiated combustion products and to reject waste heat from the cycle;

closing said exhaust valve;

opening said intake valve.

* * * * *